(12) United States Patent
Coronado et al.

(10) Patent No.: US 8,341,364 B2
(45) Date of Patent: Dec. 25, 2012

(54) MAINTAINING ASYNCHRONOUS MIRRORING

(75) Inventors: Juan A. Coronado, Tucson, AZ (US);
Christina A. Lara, Tucson, AZ (US);
Lisa R. Martinez, Tucson, AZ (US);
Robert J. McNamara, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/855,560

(22) Filed: Aug. 12, 2010

(65) Prior Publication Data
US 2012/0042139 A1    Feb. 16, 2012

(51) Int. Cl.
*G06F 12/16* (2006.01)

(52) U.S. Cl. ......... 711/162; 711/161; 711/165; 714/6.1; 714/6.23

(58) Field of Classification Search .......... 711/161, 711/162, 165; 714/6.1, 6.23
See application file for complete search history.

(56) References Cited

U.S. PATENT DOCUMENTS

| | | | | |
|---|---|---|---|---|
| 5,937,414 | A * | 8/1999 | Souder et al. | 707/616 |
| 7,085,906 | B2 * | 8/2006 | Barth et al. | 711/167 |
| 7,177,866 | B2 | 2/2007 | Holenstein et al. | |
| 7,219,103 | B2 | 5/2007 | Vasudevan et al. | |
| 2002/0083286 | A1 * | 6/2002 | Gray | 711/167 |
| 2005/0251633 | A1 * | 11/2005 | Micka et al. | 711/162 |
| 2006/0236061 | A1 * | 10/2006 | Koclanes | 711/170 |
| 2007/0033356 | A1 * | 2/2007 | Erlikhman | 711/162 |
| 2007/0233980 | A1 | 10/2007 | Cox et al. | |
| 2008/0082591 | A1 * | 4/2008 | Ahal et al. | 707/204 |
| 2009/0313311 | A1 | 12/2009 | Hoffmann et al. | |
| 2010/0030959 | A1 * | 2/2010 | Satoyama et al. | 711/112 |

FOREIGN PATENT DOCUMENTS
EP    0 874 314 A1    10/1998

OTHER PUBLICATIONS

Nobutatsu Nakamura et al., "A Flexible Replication Mechanism with Extended Database Connection Layers", Fifth IEEE International Symposium on Network Computing and Applications, 2006, http://cs.dialog.com/client/csc_qj151/.

Xiaotao Liu et al., "The Case for Semantic Aware Remote Replication", AMC Library, Oct. 30, 2006, http://delivery.acm.org/10.1145/1180000/1179575/p79-liu.pdf?key1=1179575&key2=4662851721&coll=ACM&dl=ACM&CFID=86658186&CFTOKEN=32096734.

Xiaoguang Liu et al., "ELVM: A LVM-based Remote Replication System", International Forum on Computer Science-Technology and Applications, 2009, http://ieeexplore.ieee.org/stamp/stamp.jsp?arnumber=5384615.

* cited by examiner

*Primary Examiner* — Jae Yu
(74) *Attorney, Agent, or Firm* — Kunzler Law Group, PC

(57) ABSTRACT

An apparatus, system, and method are disclosed for maintaining asynchronous mirroring. A detection module detects insufficient storage space to store a snapshot of a logical volume in at least one of a primary storage system and a secondary storage system. The primary storage system comprises the logical volume. A write from a host to the logical volume is acknowledged, maintaining asynchronous mode mirroring between the primary storage system and the host. The mirror module mirrors the write to the logical volume at the secondary storage system using a backup synchronous mode in response to detecting the insufficient storage space. Under the backup synchronous mode, the primary storage system acknowledges the write to the host while concurrently mirroring the write to the secondary storage system. The secondary storage system acknowledges the mirrored write to the primary storage system.

20 Claims, 6 Drawing Sheets

MAINTAINING ASYNCHRONOUS MIRRORING

BACKGROUND

1. Field

The subject matter disclosed herein relates to maintain mirroring and more particularly relates to maintain asynchronous mirroring when storage is depleted on a primary or a secondary storage system.

2. Description of the Related Art

Storage systems are used to store data for one or more hosts. Because the data is stored in a primary storage system is often very valuable, the data may be backed up to a secondary storage system.

The primary storage system may be mirrored to the secondary storage system to reduce the probability of data loss if an element of the primary storage system fails. Under mirroring, the primary storage system and secondary storage system store a snapshot of the most recently modified data. Subsequent writes to the primary storage system are then written or mirrored to the secondary storage system.

Unfortunately, if the primary storage system or the secondary storage system does not have sufficient storage space to create and/or receive snapshots and mirrored writes mirroring may be deactivated. When mirroring is deactivated, the valuable data in primary storage system is at risk if an element of the primary storage system fails.

In addition, reactivating mirroring may be time consuming. For example, an administrator may need to determine the cause of insufficient storage being available. In addition, the administrator may need to allocate more storage space, free up storage space, rebalance storage space between one or more storage pools, and/or add storage space before sufficient storage space is available to reactivate mirroring. As a result of such delays, reactivating mirroring may require a longer recovery point once sufficient storage is available.

BRIEF SUMMARY

From the foregoing discussion, it should be apparent that a need exists for an apparatus, system, and method to maintain mirroring. Beneficially, such an apparatus, system, and method would maintain mirroring of a primary storage system to a secondary storage system even when there is insufficient storage space for snapshots on the primary storage system or the secondary storage system.

The present invention has been developed in response to the state of the current art, and in particular, in response to the problems and needs in the current art that have not yet been fully solved by currently available mirroring maintenance methods. Accordingly, the present invention has been developed to provide an apparatus, system, and method for maintaining mirroring that overcome many or all of the above-discussed shortcomings in the art.

The apparatus maintaining mirroring is provided with a plurality of modules configured to functionally execute the necessary steps of detecting insufficient storage space and mirroring a write. These modules in the described embodiments include a detection module and a mirror module.

The detection module detects insufficient storage space to store a snapshot of a logical volume in at least one of a primary storage system and a secondary storage system. The primary storage system comprises the logical volume. The mirror module incrementally mirrors a write from a host to the logical volume at the secondary storage system using an asynchronous mode.

The mirror module mirrors the write to the logical volume at the secondary storage system using a backup synchronous mode in response to detecting the insufficient storage space. Under the backup synchronous mode, the primary storage system acknowledges the write to the host in response to receiving the write from the host. The primary storage system further mirrors the write to the secondary storage system in response to receiving the write from the host. The secondary storage system acknowledges the mirrored write to the primary storage system in response to receiving the mirrored write.

A system of the present invention is also presented for maintaining mirroring. The system may be embodied storage network. In particular, the system, in one embodiment, includes a host, a secondary storage system, and a primary storage system.

The primary storage system includes a logical volume. The primary storage system detects insufficient storage space to store a snapshot of the logical volume in at least one of the primary storage system and the secondary storage system. The primary storage system mirrors a write from the host to the logical volume at the secondary storage system using an asynchronous mode. Under the asynchronous mode, the primary storage system mirrors the write at the secondary storage system in response to receiving the write from the host. The secondary storage system acknowledges the mirrored write to the primary storage system in response to receiving the mirrored write. In addition, the primary storage system acknowledges the write to the host in response to receiving the write from the host.

The primary storage system further mirrors the write to the logical volume at the secondary storage system using a backup synchronous mode in response to detecting the insufficient storage space. Under the backup synchronous mode the primary storage system acknowledges the write to the host in response to receiving the write from the host, mirrors the write to the secondary storage system in response to receiving the write from the host, and the secondary storage system acknowledges the mirrored write to the primary storage system in response to receiving the mirrored write.

A method of the present invention is also presented for maintaining mirroring. The method in the disclosed embodiments substantially includes the steps necessary to carry out the functions presented above with respect to the operation of the described apparatus and system.

A detection module detects insufficient storage space to store a snapshot of a logical volume in at least one of a primary storage system and a secondary storage system. The primary storage system comprises the logical volume and incrementally mirrors a write from a host to the logical volume at the secondary storage system using an asynchronous mode.

A mirror module mirrors the write to the logical volume at the secondary storage system using a backup synchronous mode in response to detecting the insufficient storage space. Under the backup synchronous mode, the primary storage system acknowledges the write to the host in response to receiving the write from the host. The primary storage system further mirrors the write to the secondary storage system in response to receiving the write from the host. The secondary storage system acknowledges the mirrored write to the primary storage system in response to receiving the mirrored write.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
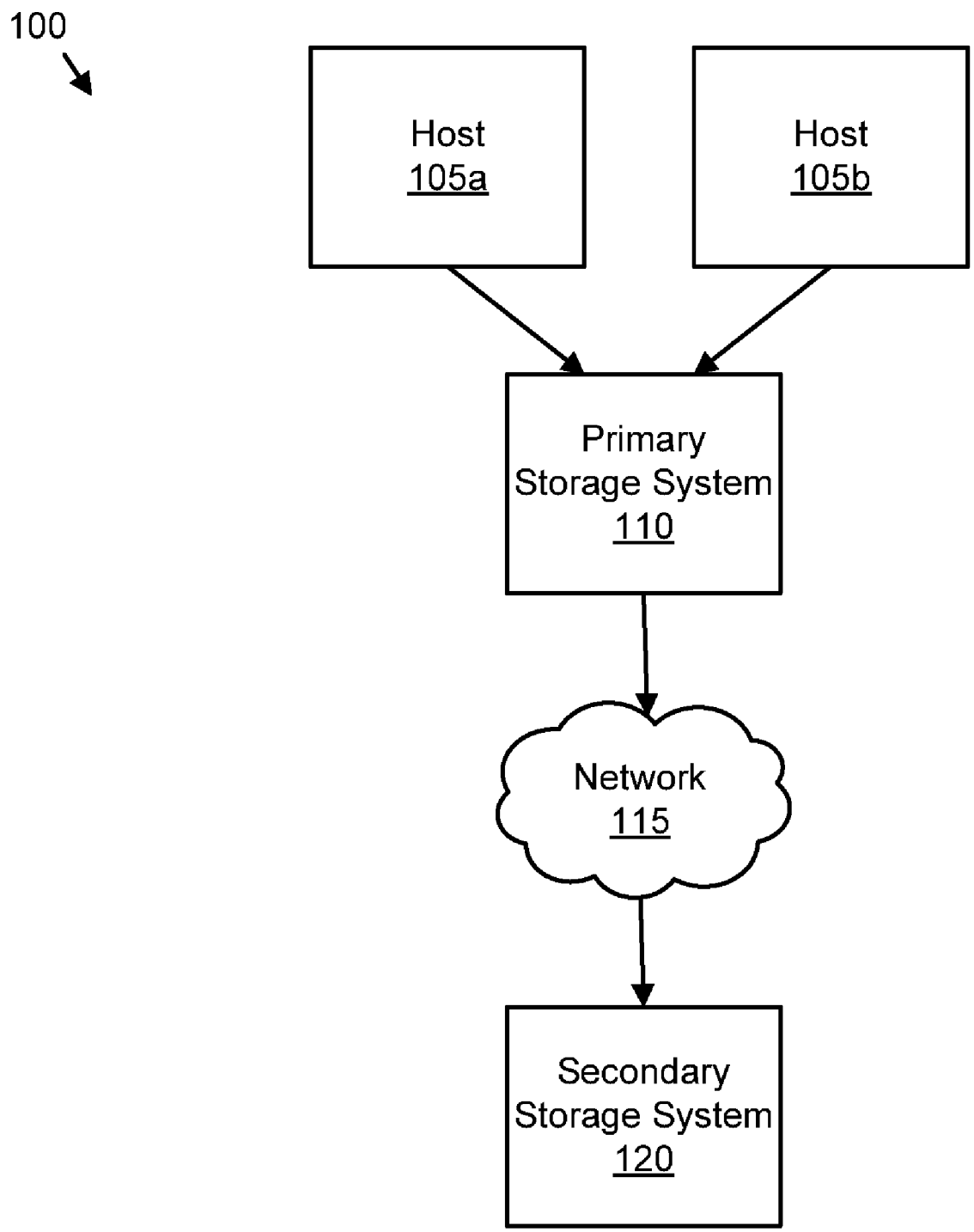
FIG. 1 is a schematic block diagram illustrating one embodiment of a storage network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a storage network 100. The storage network 100 may be a Storage Area Network (SAN), and enterprise network, or the like. The storage network 100 includes one or more hosts 105, a primary storage system 110, a network 115, and a secondary storage system 120. One of skill in the art will recognize that the embodiment may be practiced with any number of hosts 105, primary storage systems 110, networks 115, and secondary storage systems 120.

The hosts 105 may store data to the primary storage system 110. Because the data is valuable, the primary storage system 110 may backup or mirror the data to the secondary storage system 120, so that second storage system 120 also stores a copy of the data.

The secondary storage system 120 communicates with the primary storage system 110 over the network 115. The network 115 may be the Internet, a Wide Area Network (WAN), a Local Area Network (LAN), a dedicated communications channel, or the like.

The primary storage system 110 may mirror the data to the secondary storage system 120 by creating a snapshot of the data stored on the primary storage system 110. In one embodiment, the snapshot is an initial copy of all data stored in a logical volume and/or consistency group of the primary storage system 110.

The primary storage system 110 may copy or mirror the snapshot to the secondary storage system 120. The snapshot may function as a baseline copy of the data. Thereafter, the primary storage system 110 may subsequently incrementally mirror each write to the primary storage system 110 with a corresponding mirrored write to the secondary storage system 120. Thus the snapshot and the mirrored writes on the secondary storage system 120 form a data set that is consistent with the data stored on the primary storage system 110.

Figure 2:
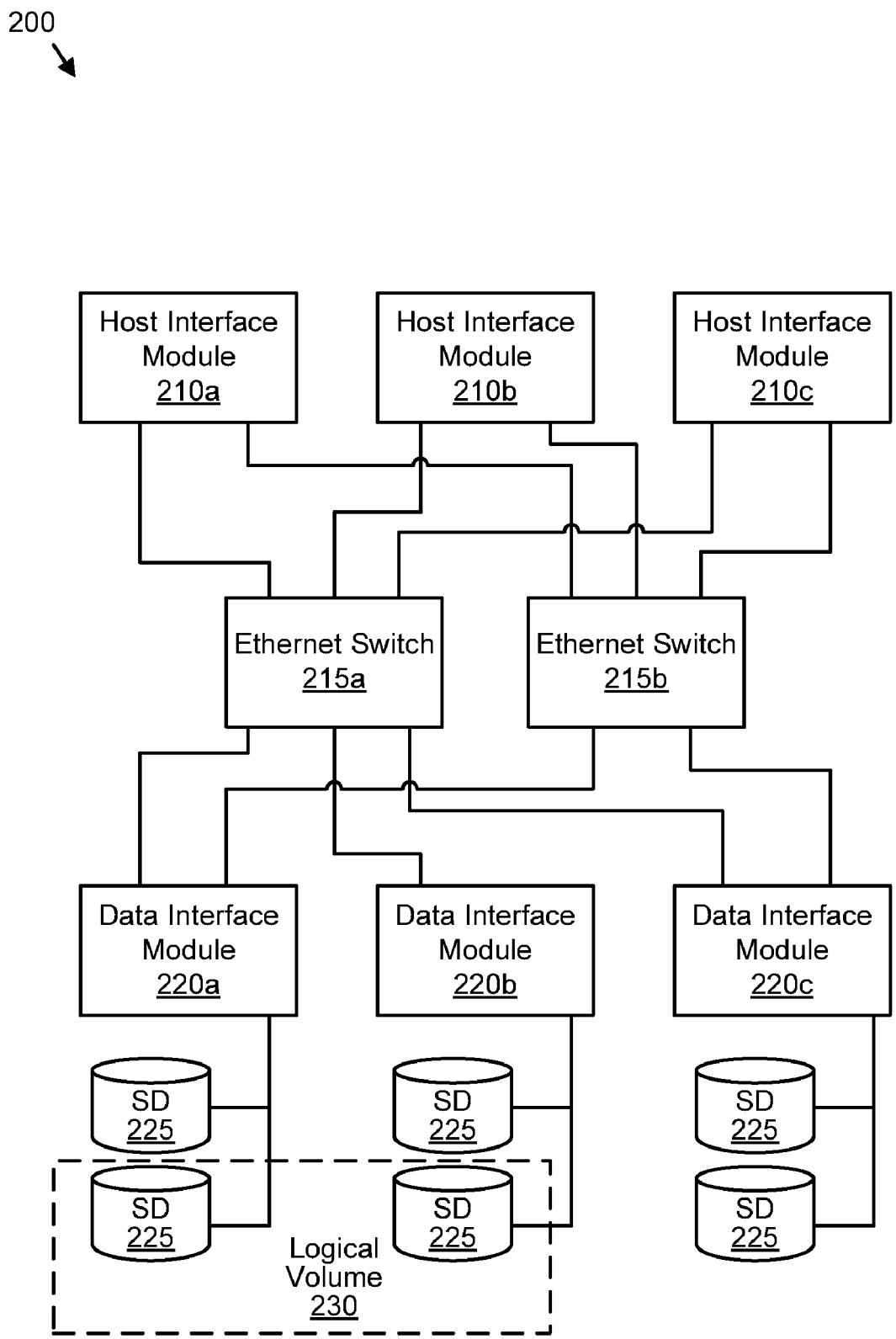
FIG. 2 is a schematic block diagram illustrating one embodiment of a storage system.

FIG. 2 is a schematic block diagram illustrating one embodiment of a storage system 200. The storage system 200 may be the primary storage system 110 and/or the secondary storage system 120 of FIG. 1. In one embodiment, the storage system 200 is an XIV Storage System produced by International Business Machines Corporation (IBM) of Armonk, N.Y. The description of the storage system 200 refers to elements of FIG. 1, like numbers referring to like elements. The storage system 200 includes a plurality of host interface modules 210, a plurality of Ethernet switches 215, a plurality of data interface modules 220, and a plurality of storage devices 225.

The host interface modules 210 may communicate directly with the hosts 105. Alternatively, the host interface modules 210 may communicate with the hosts 105 through the network 115. The hosts interface modules 210 may include iSCSI and/or Fibre Channel ports. The iSCSI and Fibre Channel ports may connect to the hosts 105 and/or to the network 115.

The host interface modules 210 may communicate through the Ethernet switches 215 with the data interface modules 220. Each data interface module 220 may communicate with and/or control a plurality of storage devices 225. In one embodiment, each data interface module 220 includes a storage controller and cache memory. In a certain embodiment, each data interface module 220 communicates with 12 Serial Advanced Technology Attachment (SATA) disk drives. The SATA disk drives may used as the non-volatile memory for storing data. The cache memory may be used for caching data previously read, pre-fetching of data from a storage device 225, and for delayed destaging of previously written data.

In one embodiment, one or more storage devices 225 and/or one or more portions of storage devices 225 are organized as a logical volume 230. The logical volume 230 may also be referred to as a consistency group.

The storage system 200 may mirror data from the logical volume 230 by creating a snapshot of the last modified logical volume 230. In one embodiment, the storage system 200 suspends writes to the logical volume 230. The storage system 200 may then copy the contents of the logical volume 230 to the snapshot while the snapshot is created. If the storage system 200 is the primary storage system 110, the storage system 200 may then copy the snapshot to the secondary storage system 120. In one embodiment, the primary storage system 110 mirrors writes to the secondary storage system 120 using asynchronous mode mirroring as will be described hereafter.

Insufficient storage space to support asynchronous mirroring, either in the primary storage system 110 and/or the secondary storage system 120, is referred to herein as a storage space failure. For example, a storage space failure may result from either the primary storage system 110 or the secondary storage system 120 lacking sufficient storage space to store a snapshot. The primary storage system 110 may deactivate mirroring to the secondary storage system 120 in response to a storage space failure. As a result, the data stored on the primary storage device 110 is not protected from a failure of a device of the primary storage system 110 such as a failure of a storage device 225, a data interface module 220, an Ethernet switch 215, and/or a host interface module 210.

Additional storage devices 225 may be added to the primary storage system 110 and/or to the secondary storage system 120 to provide sufficient storage space to again support asynchronous mirroring. Alternatively, data such as archival copies and redundant data may be purged from the primary storage system 110 and/or the secondary storage system 120 to provide sufficient storage space. However, even after sufficient storage space is provided to support mirroring, mirroring may be difficult to restart while inconsistencies between the primary storage system 110 and the secondary storage system 120 are resolved. The embodiments discussed hereafter maintain mirroring during a storage space failure and other failures that may precipitate deactivation of mirroring.

Figure 3:
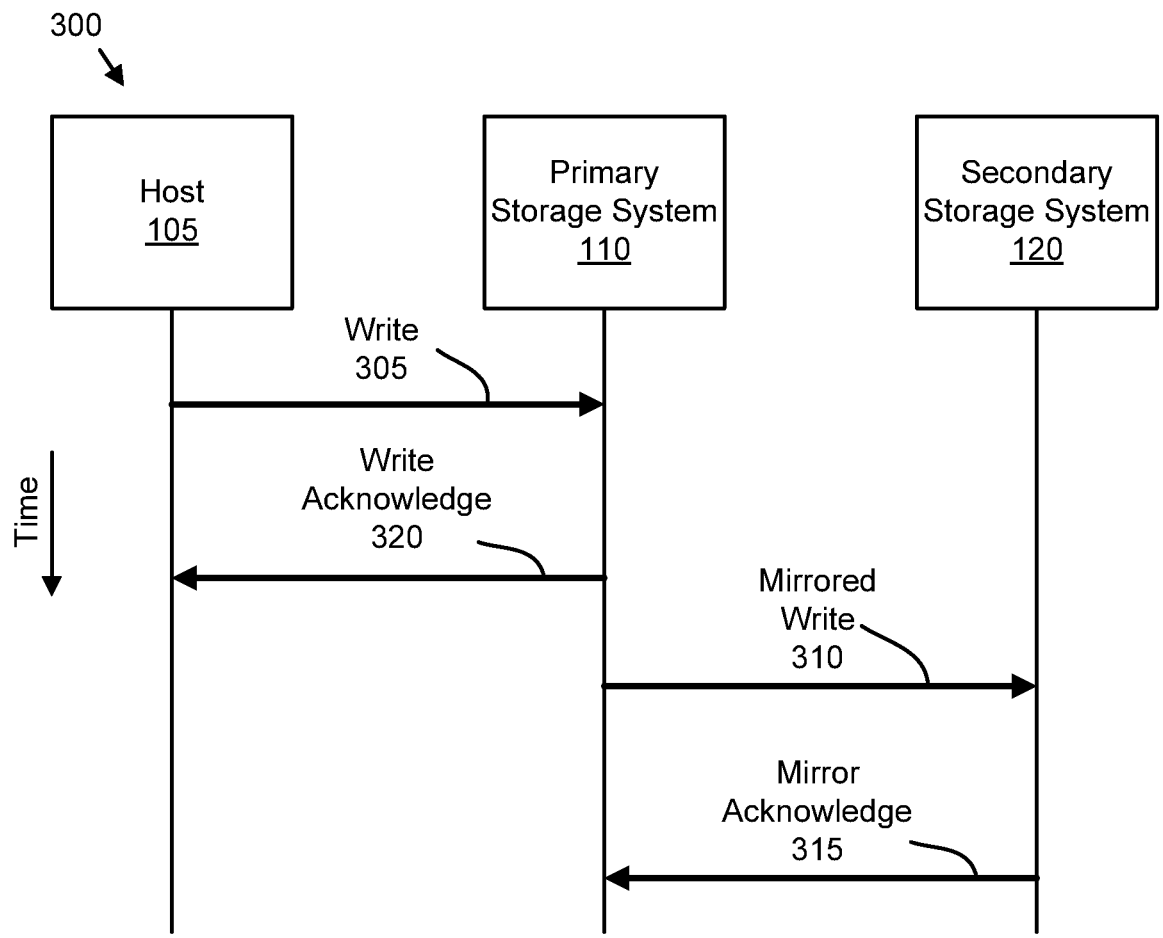
FIG. 3 is a schematic drawing illustrating one embodiment of asynchronous mode mirroring.

FIG. 3 is a schematic drawing illustrating one embodiment of asynchronous mode mirroring 300. The asynchronous mode mirroring 300 may be employed to mirror data from the primary storage system 110 to the secondary storage system 120. The description of asynchronous mode mirroring 300 refers to elements of FIGS. 1-2, like numbers referring to like elements. FIG. 3 depicts timelines for activity of the host 105, the primary storage system 110, and the secondary storage system 120, with progressively later activities depicted as lower on the timelines. The depiction of activity timing is relative.

The host 105 issues a write 305 to the primary storage system 110. The write 305 may write new data to the primary storage system 110, overwrite existing data, delete data, or the like. The primary storage system 110 acknowledges the write 305 to the host 105 with a write acknowledge 320 in response to receiving the write 305 from the host 105.

The primary storage system 110 mirrors the write 305 by issuing a mirrored write 310 to the secondary storage system 120 in response to the write acknowledgement 320. The secondary storage system 120 acknowledges the mirrored write 310 by issuing a mirrored acknowledge 315 to the primary storage system 110 in response to receiving a mirrored write 310.

The primary storage system 110 may employ the asynchronous mode 300 to mirror the write 305 from a host 105 to the secondary storage system 120. In one embodiment, the primary storage system 110 employs the asynchronous mode 300 when there is no storage space failure. The write 305, mirrored write 310, mirror acknowledge 315, and write acknowledge 320 may be coded packets exchanged between the host 105, the primary storage system 110, and the secondary storage system 120.

Figure 4:
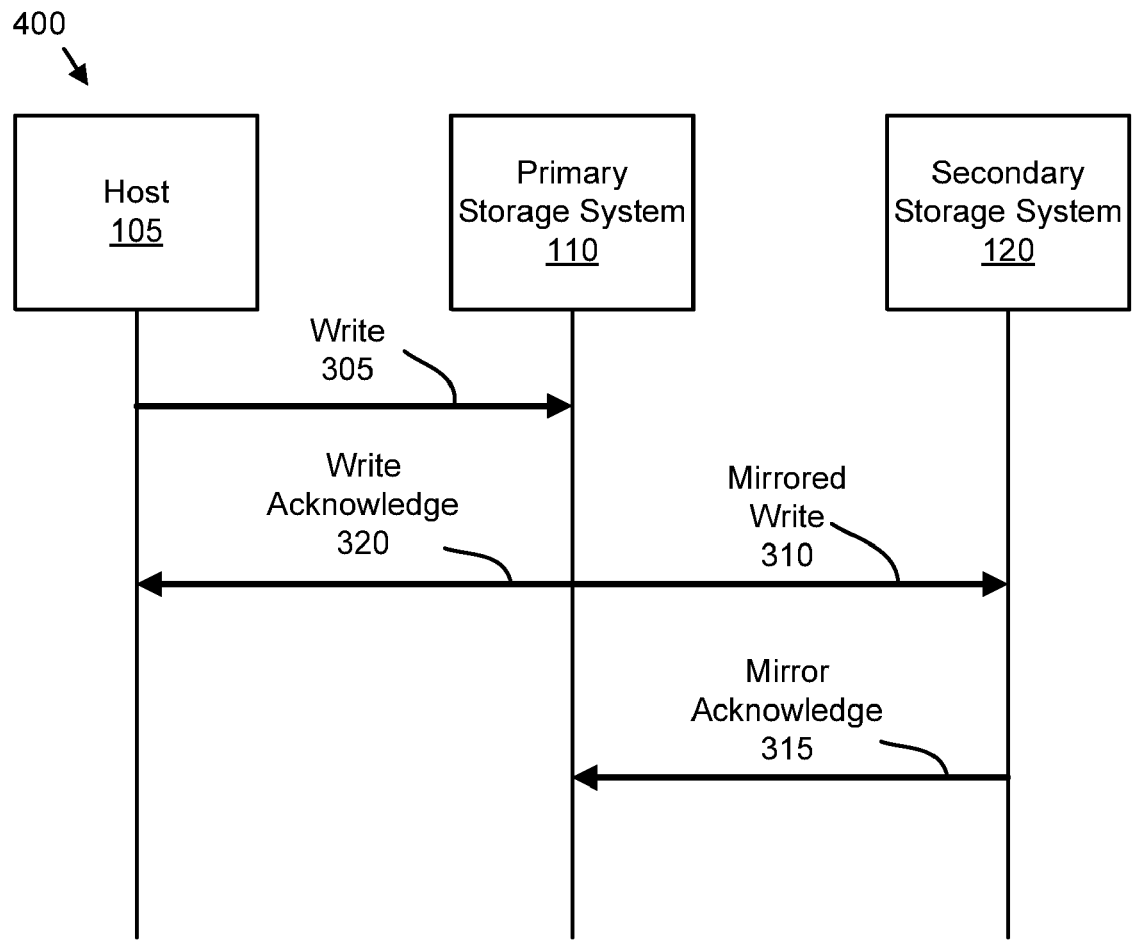
FIG. 4 is a schematic drawing illustrating one embodiment of backup synchronous mode mirroring.

FIG. 4 is a schematic drawing illustrating one embodiment of backup synchronous mode mirroring 400. The backup synchronous mode mirroring 400 may be employed to mirror data from the primary storage system 110 to the secondary storage system 120. The description of backup synchronous mode mirroring 400 refers to elements of FIGS. 1-3, like numbers referring to like elements. FIG. 4 depicts timelines for activity of the host 105, the primary storage system 110, and the secondary storage system 120, with progressively later activities depicted as lower on the timelines, as shown in FIG. 3.

The host 105 issues the write 305 to the primary storage system 110. The primary storage system 110 acknowledges the write 305 by issuing the write acknowledge 320 to the hosts 305. The write acknowledge 320 is issued in response to receiving the write 305 from the host 105. The primary storage system 110 also mirrors the write 305 by issuing a mirrored write 310 to the secondary storage system 120 in response to receiving the write 305 from the host 105.

Thus write acknowledge 320 need not complete before the mirrored write 310 is issued. Instead the mirrored write 310 can be issued without waiting for the completion of the write acknowledge 310. The mirrored writes 310 can continue even if a storage space failure delays write acknowledgements 320 and/or mirror acknowledgements 310. In contrast, under the asynchronous mode, the mirrored write 310 is only issued in response to the write acknowledge 320. Thus delays in completion of the write acknowledge 320 may slow and/or halt the mirrored writes 310.

The secondary storage system 120 acknowledges the mirrored write 310 by issuing the mirror acknowledge 315 to the primary storage system 110. The secondary storage system 120 may issue the mirror acknowledge 315 in response to receiving the mirrored write 310.

In one embodiment, the primary storage system 110 acknowledges the write 305 to the host 105 by issuing the write acknowledge 320 and concurrently mirrors the write 305 to the secondary storage system 120 by issuing the mirrored write 310 in response to receiving the write 305 from the host 105. The primary storage system 110 may concurrently issue the write acknowledge 320 and the mirrored write 310 by issuing both the write acknowledge 320 and the mirrored write 310 only in response to receiving the write 305, wherein in mirrored write 310 is not dependent on the write acknowledge 320. Alternatively, the primary storage system 110 may acknowledge the write 305 by issuing the write acknowledge 320 after issuing the mirrored write 310. The secondary storage system 120 acknowledges the mirrored write 310 by issuing the mirror acknowledge 315 to the primary storage system 110 in response to receiving the mirrored write 310.

The primary storage system 110 may employ the backup synchronous mode 400 in response to a storage space failure rather than deactivating mirroring. When employing the backup synchronous mode 400, mirroring of data to the secondary storage system 120 may continue until a storage space failure is mitigated. In addition, the performance of the primary storage system 110 may not be impacted.

Figure 5:
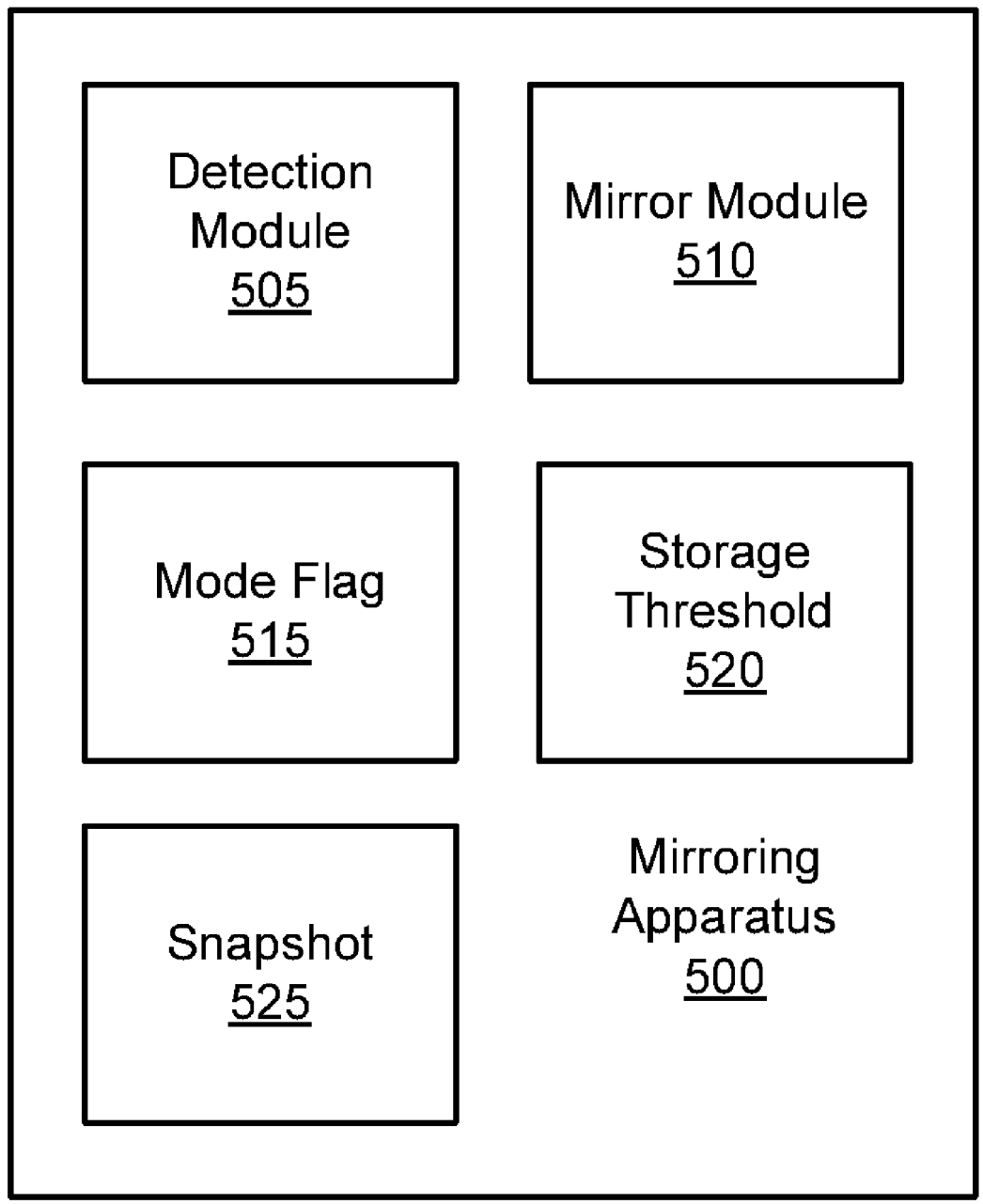
FIG. 5 is a schematic block diagram illustrating one embodiment of a mirroring apparatus.

FIG. 5 is a schematic block diagram illustrating one embodiment of a mirroring apparatus 500. The mirroring apparatus 500 may be embodied in a storage system 200. Alternatively, the mirroring apparatus 500 may be embodied in a host 105. In a certain embodiment, the mirroring apparatus 500 is embodied in a device in communication with the network 115. The description of the mirroring apparatus 500 refers to elements of FIGS. 1-4, like numbers referring to like elements. The mirroring apparatus 500 includes a detection module 505 and a mirror module 510. In addition, the mirroring apparatus 500 may include a mode flag 515, a storage threshold 520, and the snapshot 525.

The detection module 505, the mirror module 510, the mode flag 515, and the storage threshold 520 may be implemented with hardware circuits. Alternatively, the detection module 505, the mirror module 510, the mode flag 515, and the storage threshold 520 may be implemented as a computer program product. The computer program product may comprise a computer readable medium having a computer readable program that executes on a processor to perform the functions of the detection module 505, the mirror module 510, the mode flag 515, and the storage threshold 520.

The detection module 505 detects insufficient storage space to store a snapshot 525 of the logical volume 230 in at least one of the primary storage system 110 and the secondary storage system 120. In one embodiment, the detection module 505 monitors available storage space in the primary storage system 110 and the secondary storage system 120. Prior to the primary storage system 110 creating the snapshot 525 of the logical volume 230, the detection module 505 may compare a storage space requirement for the snapshot 525 to the available storage space in the primary storage system 110 and the secondary storage system 120. If there is insufficient storage space for the snapshot 525 in either the primary storage system 110 or the secondary storage system 120, the detection module 505 may detect insufficient storage space.

In an alternate embodiment, the detection module 505 may detect sufficient storage space to store the snapshot 525 in both the primary storage system 110 and the secondary storage system 120. For example, if both the primary storage system 110 and the secondary storage system 120 have sufficient storage space to store the snapshot 525, the detection module 505 may detect sufficient storage space.

The mirror module 510 mirrors the write 305 to the logical volume 230 at the secondary storage system 120 using the backup synchronous mode 400 in response to detecting the insufficient storage. Alternatively, the mirror module 510 may mirror the write 305 to the secondary storage system 120 using the asynchronous mode 300 when a storage space failure has been mitigated. For example, if an administrator adds additional storage devices 225 to either the primary storage system 110 or the secondary storage system 120 so that there is sufficient storage space for the snapshot 525, the detection module 505 may detect sufficient storage space and the mirror module 510 may mirror the write 305 to the secondary storage system 120 using the asynchronous mode 300.

The mode flag 515 may select between mirroring the write 305 to a logical volume 230 using the asynchronous mode 300 and mirroring the write 305 to the logical volume 230 using the backup synchronous mode 400. The mode flag 515 may be a data word, a bit, a register, or the like. In one embodiment, each logical volume 230 includes a mode flag 515.

The mirror module 510 may consult the mode flag 515 before mirroring a write 305 to the logical volume 230. The mirror module 510 may then mirror the write 305 to the secondary storage system 120 using the appropriate mode. For example, if the mode flag 515 indicates that the asynchronous mode 300 should be used to mirror a write 305 to the logical volume 230, the mirror module 510 may mirror the write 305 to the secondary storage system 120 using the asynchronous mode 300. Alternatively, if the mode flag 515 indicates that the backup synchronous mode 400 should be used to mirror a write 305 to the logical volume 230, the mirror module 510 may mirror the write 305 to the secondary storage system 120 using the backup synchronous mode 400.

The storage threshold 520 may be used to determine if available storage space of the primary storage system 110 and/or the secondary storage system 120 is insufficient to store the snapshot 525. The storage threshold 520 may be stored as a data value. In one embodiment, each storage system 200 has a storage threshold 520. Alternatively, each logical volume 230 may have a storage threshold 520.

The storage threshold 520 may be an absolute size of storage space. For example, the storage threshold 520 may be 6 TeraBytes (TB). Alternatively, the storage threshold 520 may be relative to the size of the snapshot 525. For example, the storage threshold 520 may be 120% of the size of the snapshot 525. In one embodiment, the storage threshold 520 is in the range of 100% to 125% of the size of the snapshot 525.

Figure 6:
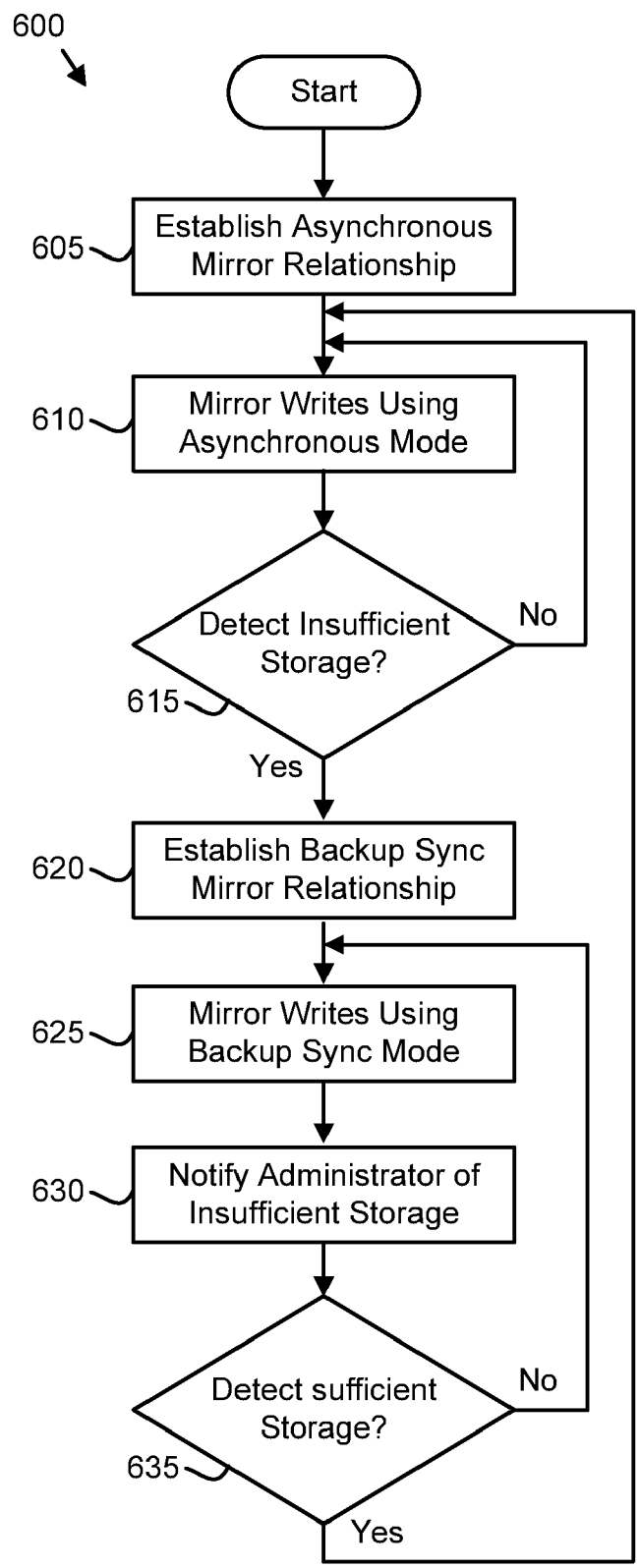
FIG. 6 is a schematic flow chart diagram illustrating one embodiment of a mirroring maintenance method.

FIG. 6 is a schematic flow chart diagram illustrating one embodiment of a mirroring maintenance method 600. The method 600 maintains mirroring of the primary storage system 110 to the secondary storage system 120 in the event of a storage space failure. The method 600 may perform the functions of the system and apparatus of FIGS. 1-5. The description of the method 600 refers to elements of FIGS. 1-5, like numbers referring to like elements.

The method 600 may be performed by a computer program product. The computer program product may comprise a computer readable medium such as a tangible computer readable storage medium. The computer readable medium may have a computer readable program. The computer readable program may be executed by a processor, computer, or the like to perform the operations of the method 600. Alternatively, the method 600 may be performed by hardware circuits.

The method 600 starts, and in one embodiment the mirror module 510 establishes 605 an asynchronous mode mirror relationship between the primary storage system 110 and the secondary storage system 120. In a certain embodiment, the mirror module 510 sets the mode flag 515 to indicate the asynchronous mode 300 for mirroring the logical volume 230.

The mirror module 510 may configure the secondary storage system 120 to receive a snapshot 525 and mirrored writes 310 from the primary storage system 110. In addition, the mirror module 510 may create a snapshot 525 of the primary storage system 110 and copy the snapshot 525 to the secondary storage system 120. The mirror module 510 may further configure the primary storage system 110 to mirror each write 305 by issuing a mirrored write 310 to the secondary storage system 120.

The mirror module 510 mirrors 610 the write 305 to logical volume 230 at the secondary storage system 120 using the asynchronous mode 300. In one embodiment, the mirror module 510 checks the mode flag 515 and mirrors 610 the write 305 using the mode indicated by the mode flag 515.

The detection module 505 detects 615 insufficient storage space to store a snapshot 525 of the logical volume 230 in at least one of the primary storage system 110 and the secondary storage system 120. The primary storage system 110 comprises the logical volume 230 and incrementally mirrors each write 305 from the host 105 to the logical volume 230 at the secondary storage system 120 using the asynchronous mode 300.

In one embodiment, the detection module 505 determines if available storage space in the primary storage system 110 is less than the storage threshold 520. The detection module 505 may further determine if available storage space in the secondary storage system 120 is less than the storage threshold 520. The detection module may detect 615 insufficient storage space in response to the available storage space for at least one the primary storage system 110 and the secondary storage system 120 being less than the storage threshold 520.

For example, if the storage threshold 520 is 110% of a size of a snapshot 525 and the snapshot 525 comprises 5 TB of data, the detection module 505 may detect 615 insufficient storage space if either the primary storage system 110 or the secondary storage system 120 has less than 5.5 TB of available storage space. The detection module 505 may further determine there is sufficient storage space if both the primary storage system 110 and the secondary storage system 120 have at least 5.5 TB of available storage space.

If the detection module 505 does not detect 615 insufficient storage space, detecting instead sufficient storage space, the mirror module 510 mirrors 610 the write 305 to logical volume 230 at the secondary storage system 120 using the asynchronous mode 300 in response to detecting the sufficient storage space. If the detection module 505 detects 615 insufficient storage, the mirror module 510 establishes 620 a backup synchronous mode mirror relationship between the primary storage system 110 and the secondary storage system 120.

In one embodiment, the mirror module 510 sets the mode flag 515 to indicate the backup synchronous mode 400 for mirroring the logical volume 230 to establish 620 the backup synchronous mode mirror relationship. In addition, the mirror module 510 may prevent the primary storage system 110 from deactivating mirroring.

The mirror module 510 mirrors 625 the write 305 to the logical volume 230 at the secondary storage system 120 using the backup synchronous mode 300 in response to detecting 615 the insufficient storage space. Under the backup synchronous mode 400, the primary storage system 110 acknowledges the write 305 with a write acknowledge 320 to the host 105 in response to receiving the write 305 from the host 105. The primary storage system 110 further mirrors the write 305 by issuing a mirrored write 310 to the secondary storage system 120 in response to receiving the write 305 from the host 105. The secondary storage system 20 acknowledges the mirrored write 310 by issuing a mirror acknowledge 315 to the primary storage system 110 in response to receiving the mirrored write 310.

In one embodiment, the detection module 505 notifies 630 the administrator that there is insufficient storage space to store the snapshot 525 of the logical volume 230. In response to the notification, the administrator may mitigate the insufficient storage space by adding storage devices 225, purging unneeded data, or the like. In one embodiment, the detection module 505 only notifies 630 the administrator that there is insufficient storage space once for each storage space failure.

The detection module 505 detects 635 sufficient storage space to store the snapshot in both the primary storage system 110 and the secondary storage system 120. In one embodiment, the detection module 505 detects 635 the sufficient storage space if the available storage space in both the primary storage system 110 and the secondary storage system 120 are at least equal to the storage threshold 520.

If the detection module 505 detects 635 sufficient storage space to store the snapshot in both the primary storage system 110 and the secondary storage system 120, the mirror module 510 mirrors 610 the write 305 to logical volume 230 at the secondary storage system 120 using the asynchronous mode 300 in response to detecting 635 the sufficient storage space. If the detection module 505 does not detect 635 sufficient storage space to store the snapshot 525 in both the primary storage system 110 and the secondary storage system 120, the mirror module 510 mirrors 625 the write 305 to the logical volume 230 at the secondary storage system 120 using the backup synchronous mode 300.

By maintaining mirroring 625 using the backup synchronous mode 400 in response to detecting 615 insufficient storage space, the method 600 supports continued backup of the primary storage system 110 while the storage space failure is mitigated. In addition, the time and expense of reactivating mirroring is avoided.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for maintaining asynchronous mirroring, the apparatus comprising:
   a detection module detecting insufficient storage space to store a snapshot of a logical volume in at least one of a primary storage system and a secondary storage system, wherein the primary storage system comprises the logical volume and a mirror module incrementally mirrors a write from a host to the logical volume at the secondary storage system using an asynchronous mode; and
   the mirror module mirroring the write to the logical volume at the secondary storage system using a backup synchronous mode in response to detecting the insufficient storage space, wherein under the backup synchronous mode the primary storage system acknowledges the write to the host in response to receiving the write from the host, mirrors the write to the secondary storage system in response to receiving the write from the host, and the secondary storage system acknowledges the mirrored write to the primary storage system in response to receiving the mirrored write.

2. The apparatus of claim 1, wherein a mode flag for the logical volume selects between mirroring the write to logical volume using the asynchronous mode and mirroring the write to the logical volume using the backup synchronous mode.

3. The apparatus of claim 2, wherein under the asynchronous mode the primary storage system acknowledges the write to the host in response to receiving the write from the host, the mirror module mirrors the write at the secondary storage system in response to the primary storage system acknowledging the write to the host, and the secondary storage system acknowledges the mirrored write to the primary storage system in response to receiving the mirrored write.

4. The apparatus of claim 1, further comprising:
   the detection module detecting sufficient storage space to store the snapshot in both the primary storage system and the secondary storage system; and
   the mirror module mirroring the write to the logical volume at the secondary storage system using the asynchronous mode in response to detecting the sufficient storage space.

5. The apparatus of claim 1, further comprising:
   the mirror module establishing a backup synchronous mode mirror relationship between the primary storage system and the secondary storage system; and
   the detection module notifying an administrator that there is insufficient storage space to store the snapshot of the logical volume.

6. The apparatus of claim 1, wherein under the backup synchronous mode the primary storage system acknowledges the write to the host and the mirror module concurrently mirrors the write to the secondary storage system in response to receiving the write from the host.

7. A method for maintaining asynchronous mirroring, the method comprising:
   detecting, by use of a processor, insufficient storage space to store a snapshot of a logical volume in at least one of a primary storage system and a secondary storage system, wherein the primary storage system comprises the logical volume and incrementally mirrors a write from a host to the logical volume at the secondary storage system using an asynchronous mode; and
   mirroring the write to the logical volume at the secondary storage system using a backup synchronous mode in response to detecting the insufficient storage space, wherein under the backup synchronous mode the primary storage system acknowledges the write to the host in response to receiving the write from the host, mirrors the write to the secondary storage system in response to receiving the write from the host, and the secondary storage system acknowledges the mirrored write to the primary storage system in response to receiving the mirrored write.

8. The method of claim 7, wherein a mode flag for the logical volume selects between mirroring the write to logical volume using the asynchronous mode and mirroring the write to the logical volume using the backup synchronous mode.

9. The method of claim 8, wherein under the asynchronous mode the primary storage system acknowledges the write to the host in response to receiving the write from the host, the primary storage system mirrors the write at the secondary storage system in response to the primary storage system acknowledging the write to the host, and the secondary storage system acknowledges the mirrored write to the primary storage system in response to receiving the mirrored write.

10. The method of claim 7, the method further comprising:
    detecting sufficient storage space to store the snapshot in both the primary storage system and the secondary storage system; and
    mirroring the write to the logical volume at the secondary storage system using the asynchronous mode in response to detecting the sufficient storage space.

11. The method of claim 7, the method further comprising:
    establishing a backup synchronous mirror relationship between the primary storage system and the secondary storage system; and
    notifying an administrator that there is insufficient storage space to store the snapshot of the logical volume.

12. The method of claim 7, wherein under the backup synchronous mode the primary storage system concurrently acknowledges the write to the host and mirrors the write to the secondary storage system in response to receiving the write from the host.

13. The method of claim 7, wherein detecting the insufficient storage space comprises:
    determining if available storage space in the primary storage system is less than a storage threshold;
    determining if available storage space in the secondary store system is less than the storage threshold; and
    detecting insufficient storage space in response to the available storage space for at least one of the primary storage system and the secondary storage system being less than the storage threshold.

14. A computer program product comprising a computer readable storage medium having computer readable program executing to perform operations for maintaining asynchronous mirroring, the operations of the computer program product comprising:
    detecting insufficient storage space to store a snapshot of a logical volume in at least one of a primary storage system and a secondary storage system, wherein the primary storage system comprises the logical volume and incrementally mirrors a write from a host to the logical volume at the secondary storage system using an asynchronous mode; and mirroring the write to the logical volume at the secondary storage system using a backup synchronous mode in response to detecting the insufficient storage space, wherein under the backup synchronous mode the primary storage system acknowledges the write to the host in response to receiving the write from the host, mirrors the write to the secondary storage system in response to receiving the write from the host, and the secondary storage system acknowledges the mirrored write to the primary storage system in response to receiving the mirrored write.

15. The computer program product of claim 14, wherein a mode flag for the logical volume selects between mirroring the write to logical volume using the asynchronous mode and mirroring the write to the logical volume using the backup synchronous mode and under the asynchronous mode the primary storage system acknowledges the write to the host in response to receiving the write from the host, the primary storage system mirrors the write at the secondary storage system in response to the primary storage system acknowledging the write to the host, and the secondary storage system acknowledges the mirrored write to the primary storage system in response to receiving the mirrored write.

16. The computer program product of claim 14, the operations further comprising detecting sufficient storage space to store the snapshot in both the primary storage system and the secondary storage system; and mirroring the write to the logical volume at the secondary storage system using the asynchronous mode in response to detecting the sufficient storage space.

17. The computer program product of claim 14, the operations further comprising establishing a backup synchronous mode mirror relationship between the primary storage system and the secondary storage system; and notifying an administrator that there is insufficient storage space to store the snapshot of the logical volume.

18. The computer program product of claim 14, wherein under the backup synchronous mode the primary storage system concurrently acknowledges the write to the host and mirrors the write to the secondary storage system in response receiving the write from the host.

19. The computer program product of claim 14, wherein detecting the insufficient storage space comprises:

determining if available storage space in the primary storage system is less than a storage threshold;

determining if available storage space in the secondary store system is less than the storage threshold; and detecting insufficient storage space in response to the available storage space for at least one of the primary storage system and the secondary storage system being less than the storage threshold.

20. A system for maintaining asynchronous mirroring, the system comprising:

a host;

a secondary storage system;

a primary storage system comprising a logical volume, the primary storage system performing the operations of:

detecting insufficient storage space to store a snapshot of the logical volume in at least one of the primary storage system and the secondary storage system, wherein the primary storage system incrementally mirrors a write from the host to the logical volume at the secondary storage system using an asynchronous mode, wherein under the asynchronous mode the primary storage system acknowledges the write to the host in response to receiving the write from the host, the primary storage system mirrors the write at the secondary storage system in response to the primary storage system acknowledging the write to the host, and the secondary storage system acknowledges the mirrored write to the primary storage system in response to receiving the mirrored write; and mirroring the write to the logical volume at the secondary storage system using a backup synchronous mode in response to detecting the insufficient storage space, wherein under the backup synchronous mode the primary storage system acknowledges the write to the host in response to receiving the write from the host, mirrors the write to the secondary storage system in response to receiving the write from the host, and the secondary storage system acknowledges the mirrored write to the primary storage system in response to receiving the mirrored write.

* * * * *